United States Patent
Kato

(10) Patent No.: US 7,706,379 B2
(45) Date of Patent: Apr. 27, 2010

(54) TS TRANSMISSION SYSTEM, TRANSMITTING APPARATUS, RECEIVING APPARATUS, AND TS TRANSMISSION METHOD

(75) Inventor: Masaki Kato, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 11/711,792

(22) Filed: Feb. 28, 2007

(65) Prior Publication Data

US 2007/0217452 A1 Sep. 20, 2007

(30) Foreign Application Priority Data

Mar. 20, 2006 (JP) ............... 2006-075918

(51) Int. Cl.
  *H04L 12/28* (2006.01)
  *H04J 3/06* (2006.01)
(52) U.S. Cl. ............... 370/394; 370/474; 370/509
(58) Field of Classification Search ............... None
  See application file for complete search history.

(56) References Cited

U.S. PATENT DOCUMENTS

| 6,577,813 | B1 * | 6/2003 | Ibaraki et al. ............... 386/111 |
| 2004/0073929 | A1 * | 4/2004 | Morello ............... 725/63 |
| 2004/0076194 | A1 * | 4/2004 | Okamoto et al. ............... 370/537 |
| 2004/0141504 | A1 * | 7/2004 | Blanc et al. ............... 370/394 |

FOREIGN PATENT DOCUMENTS

| JP | 10-303910 | 11/1998 |
| JP | 11-317768 | 11/1999 |
| JP | 2001-251266 | 9/2001 |
| JP | 2001-308876 | 11/2001 |
| JP | 3650018 | 2/2005 |

OTHER PUBLICATIONS

Notice of Reasons for Rejection mailed Jul. 28, 2009 from the Japanese Patent Office in Japanese Patent Application No. 2006-075918 and English language translation thereof (4 pages total).
Decision of Rejection, mailed Oct. 20, 2009, from the Japanese Patent Office in Japanese Patent Application No. 2006-075918 and English language translation thereof (4 pages total).
Notification of the First Office Action, mailed Oct. 9, 2009, from the Chinese Patent Office in Chinese Patent Application No. 200710084463.0 and English language translation thereof (17 pages total).

* cited by examiner

*Primary Examiner*—Andrew Lee
(74) *Attorney, Agent, or Firm*—Finnegan, Henderson, Farabow, Garret & Dunner, L.L.P.

(57) ABSTRACT

A transmitting apparatus includes an input interface which receives a TS, a counter which counts the number of packets contained in the TS and output count values, a multiplexing section which multiplexes the output count values of PCR packets contained in the TS on a predetermined position of each PCR packet, a discard section which discards null packets from the TS, and a transmitting section which transmits the TS. A receiving apparatus includes a receiving section which receives the TS, an extraction section which extracts the count values from the PCR packets contained in the received TS, and a rearranging section which rearranges the multiplex position of the PCR packets of the received TS based on the extracted count values to restore a TS equivalent to the previous TS from which the null packet has not been discarded.

7 Claims, 5 Drawing Sheets

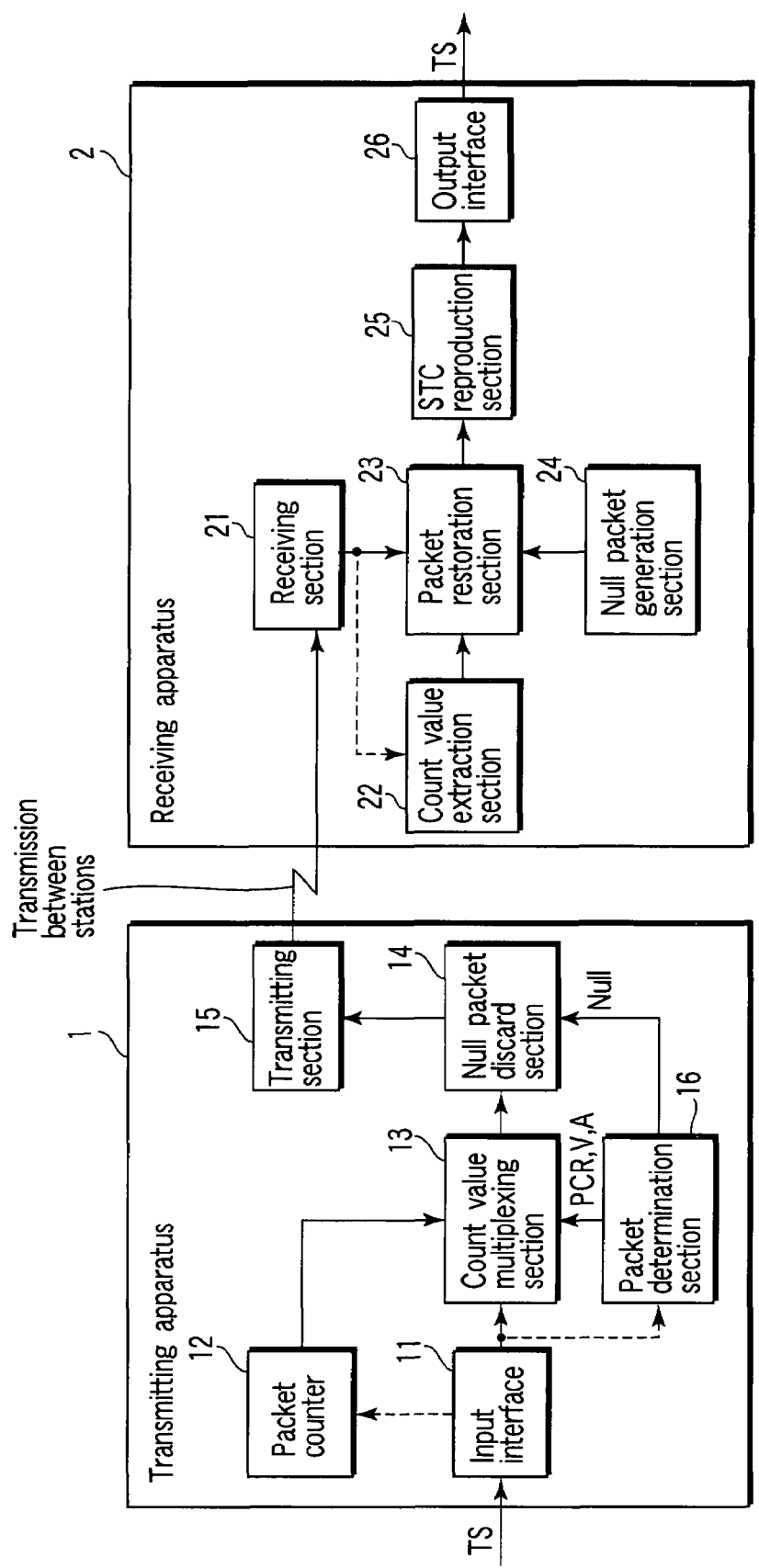
F I G. 1

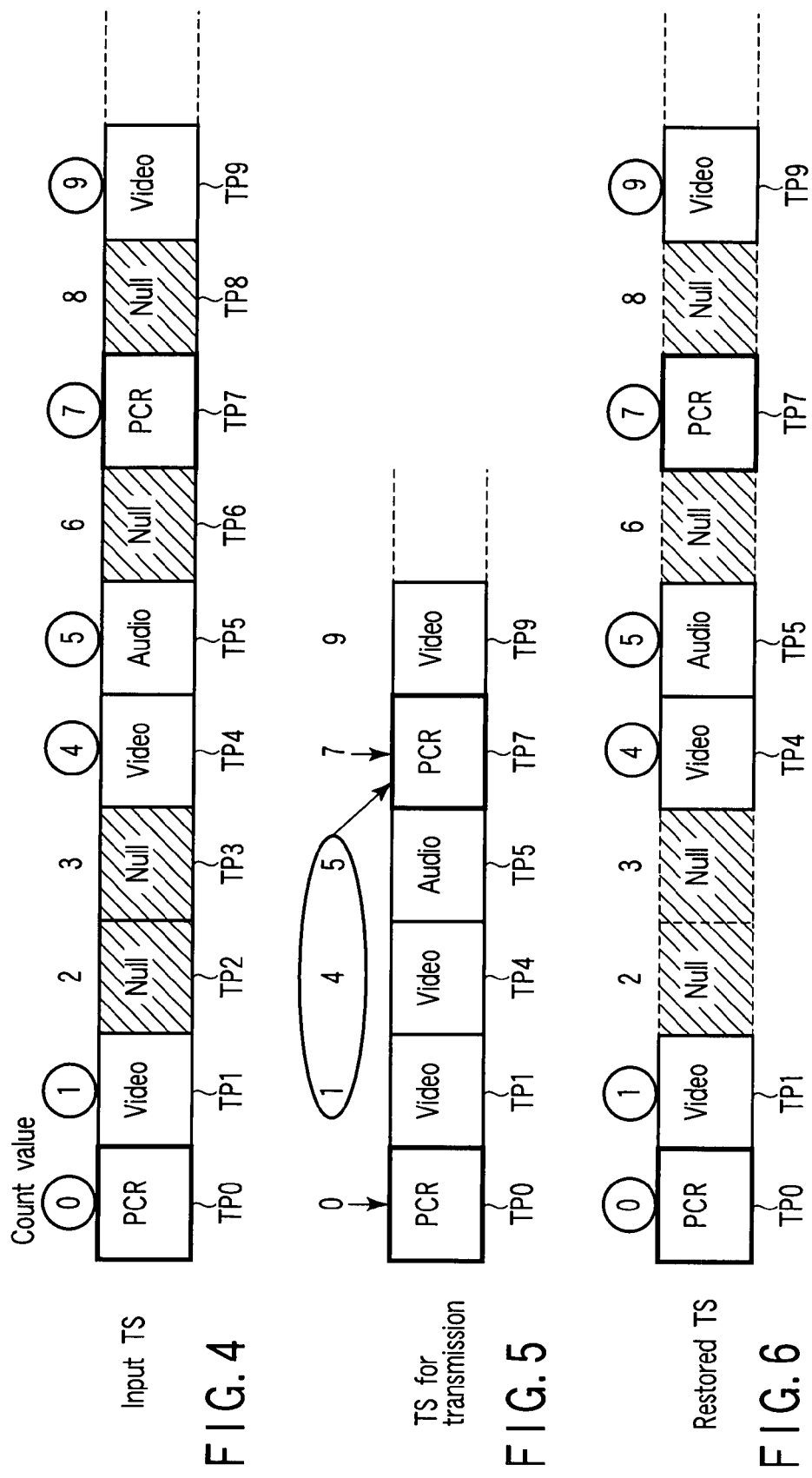

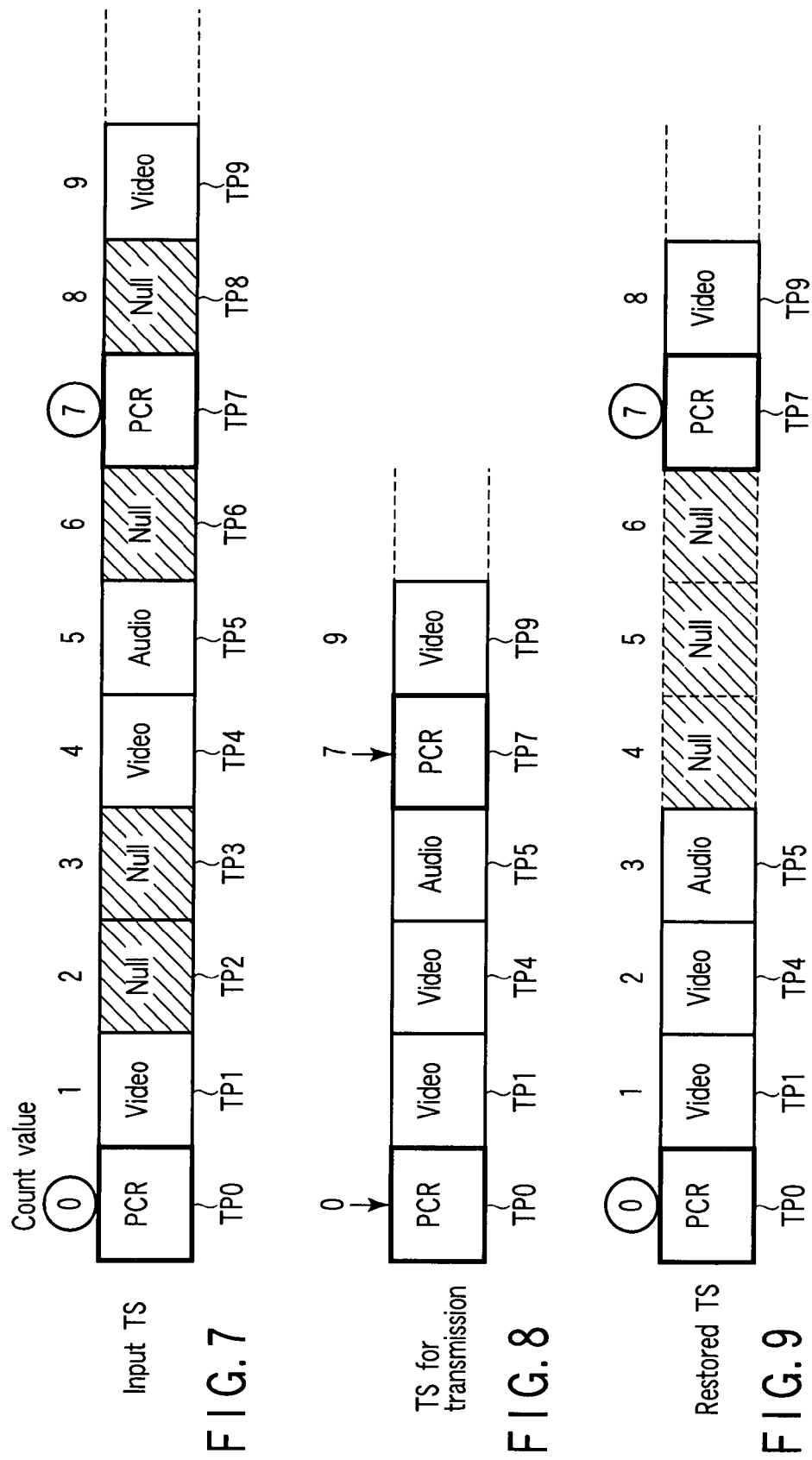

US 7,706,379 B2

TS TRANSMISSION SYSTEM, TRANSMITTING APPARATUS, RECEIVING APPARATUS, AND TS TRANSMISSION METHOD

CROSS-REFERENCE TO RELATED APPLICATIONS

This application is based upon and claims the benefit of priority from prior Japanese Patent Application No. 2006-075918, filed Mar. 20, 2006, the entire contents of which are incorporated herein by reference.

BACKGROUND OF THE INVENTION

1. Field of the Invention

The present invention relates to a transport stream (TS) transmission system and a transmitting apparatus, a receiving apparatus, and a TS transmission method for use in the TS transmission system and, more particularly, to a TS transmission system that transmits a TS for digital broadcast between broadcast stations.

2. Description of the Related Art

A TS transmitted from a broadcast station, which conforms to a broadcast standard, contains many null packets. Accordingly, when the TS is transmitted between broadcast stations, many null packets are exchanged, leading to a reduction in transmission efficiency.

A related technique is disclosed in Japanese Patent No. 3650018 (reference 1). The reference 1 discloses a technique allowing a video recorder to discard null packets contained in the TS at the TS recording time and insert null packets corresponding to the number of discarded packets to reproduce the TS at the reproducing time.

As described above, if many null packets are contained in the TS when the TS is transmitted between broadcast stations, transmission efficiency is reduced. However, if the null packets contained in the TS are discarded, the multiplex position of program clock reference (PCR) packets varies. This makes it impossible to reproduce a system time clock (STC) serving as reference time for synchronized reproduction of video data or audio data.

BRIEF SUMMARY OF THE INVENTION

An object of the present invention is to provide a TS transmission system, a transmitting apparatus, a receiving apparatus, and a TS transmission method capable of transmitting a TS containing null packets in an efficient manner.

According to an aspect of the present invention, there is provided a transport stream (TS) transmission system which transmits a TS through a transmission path, comprising: a transmitting apparatus (1) which transmits a TS to the transmission path; and a receiving apparatus (2) which receives the TS transmitted from the transmitting apparatus (1) through the transmission path, the transmitting apparatus (1) comprises: an input interface (11) which receives an input of a TS; a counter (12) which sequentially counts the number of packets contained in the input TS and output count values; a multiplexing section (13) which multiplexes the output count values of program clock reference (PCR) packets contained in the TS on a predetermined position of each PCR packet; a discard section (14) which discards null packets from the TS; and a transmitting section (15) which sequentially transmits to the transmission path for transmission of the TS in which the count values have been multiplexed on the PCR packets and from which the null packets have been discarded to the receiving apparatus (2), the receiving apparatus (2) comprises: a receiving section (21) which receives the TS transmitted from the transmitting apparatus (1) through the transmission path; an extraction section (22) which extracts the count values from the PCR packets contained in the received TS; and a rearranging section (23) which rearranges the multiplex position of the PCR packets of the received TS based on the extracted count values to restore a TS equivalent to the previous TS from which the null packet has not been discarded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an embodiment of a TS transmission system according to the present invention;

FIG. 4 is a view showing an example of a configuration of a TS input to the transmitting apparatus;

FIG. 5 is a view showing an example of a configuration of a TS transmitted from the transmitting apparatus;

FIG. 6 is a view showing an example of a configuration of a TS restored in the receiving apparatus;

FIG. 7 is a view showing another example of a configuration of a TS input to the transmitting apparatus;

FIG. 8 is a view showing another example of a configuration of a TS transmitted from the transmitting apparatus; and FIG. 9 is a view showing another example of a configuration of a TS restored in the receiving apparatus.

DETAILED DESCRIPTION OF THE INVENTION

Figure 2:
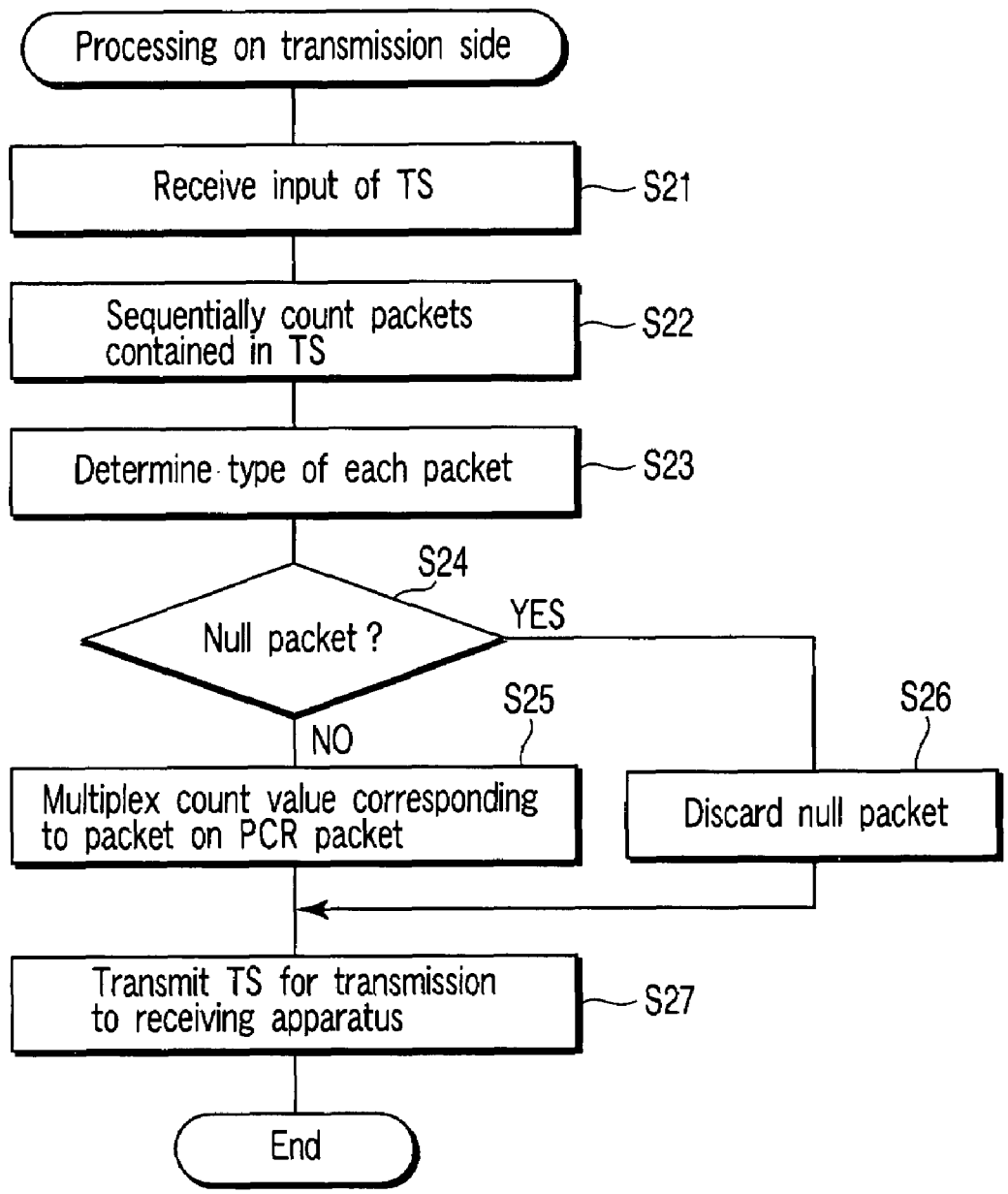
FIG. 2 is a flowchart showing the procedure and content of operation of a transmitting apparatus.

An embodiment of the present invention will be described below in detail with reference to the accompanying drawings.

FIG. 1 is a block diagram showing a configuration that transmits a TS for digital broadcast as an embodiment of a TS transmission system according to the present invention. This system includes a transmitting apparatus 1 and a receiving apparatus 2 which are connected to each other through a transmission path.

The transmitting apparatus 1 includes an input interface 11, a packet counter 12, a count value multiplexing section 13, a null packet discard section 14, a transmitting section 15, and a packet determination section 16.

The packet counter 12 sequentially counts the number of all packets in a TS input to the input interface 11, including null packets therein and outputs count values to the count value multiplexing section 13. The packet determination section 16 determines the packet type (PCR/video/audio/null) based on the packet identification (PID) of the packets constituting the input TS. The count value multiplexing section 13 multiplexes the count values other than those of the null packets on predetermined positions in the TS according to the determination made by the packet determination section 16. In this case, for example, the count values other than those of the null packets are multiplexed on Private_Byte of adaptation_field of each PCR packet constituting the TS. The null packet discard section 14 extracts null packets from the count values-multiplexed TS output from the count value multiplexing section 13 based on the determination made by the packet determination section 16 and discards them. The transmitting section 15 successively transmits packets of a TS for transmission output from the null packet discard section 14 to the receiving apparatus 2.

The receiving apparatus 2 includes a receiving section 21, a count value extraction section 22, a packet restoration section 23, a null packet generation section 24, an STC reproduction section 25, and an output interface 26.

On the receiving apparatus 2 side, the receiving section 21 receives the TS for transmission through a transmission path. The count value extraction section 22 detects the PCR packets in the received TS for transmission and extracts the count values multiplexed on Private_Byte of adaptation_field. The packet restoration section 23 inserts null packets which are generated by the null packet generation section 24 based on the count values multiplexed on the immediately previously received PCR packet and count values multiplexed on the PCR packet received this time. As a result, a TS in which the multiplex position of the PCR packets has been rearranged is obtained. The STC reproduction section 25 generates an STC correction value based on the multiplex position of the restored PCR packets and reproduces an STC using the STC correction value and a PCR value shown in the PCR packets. The output interface 26 outputs the restored TS based on the reproduced STC.

Figure 3:
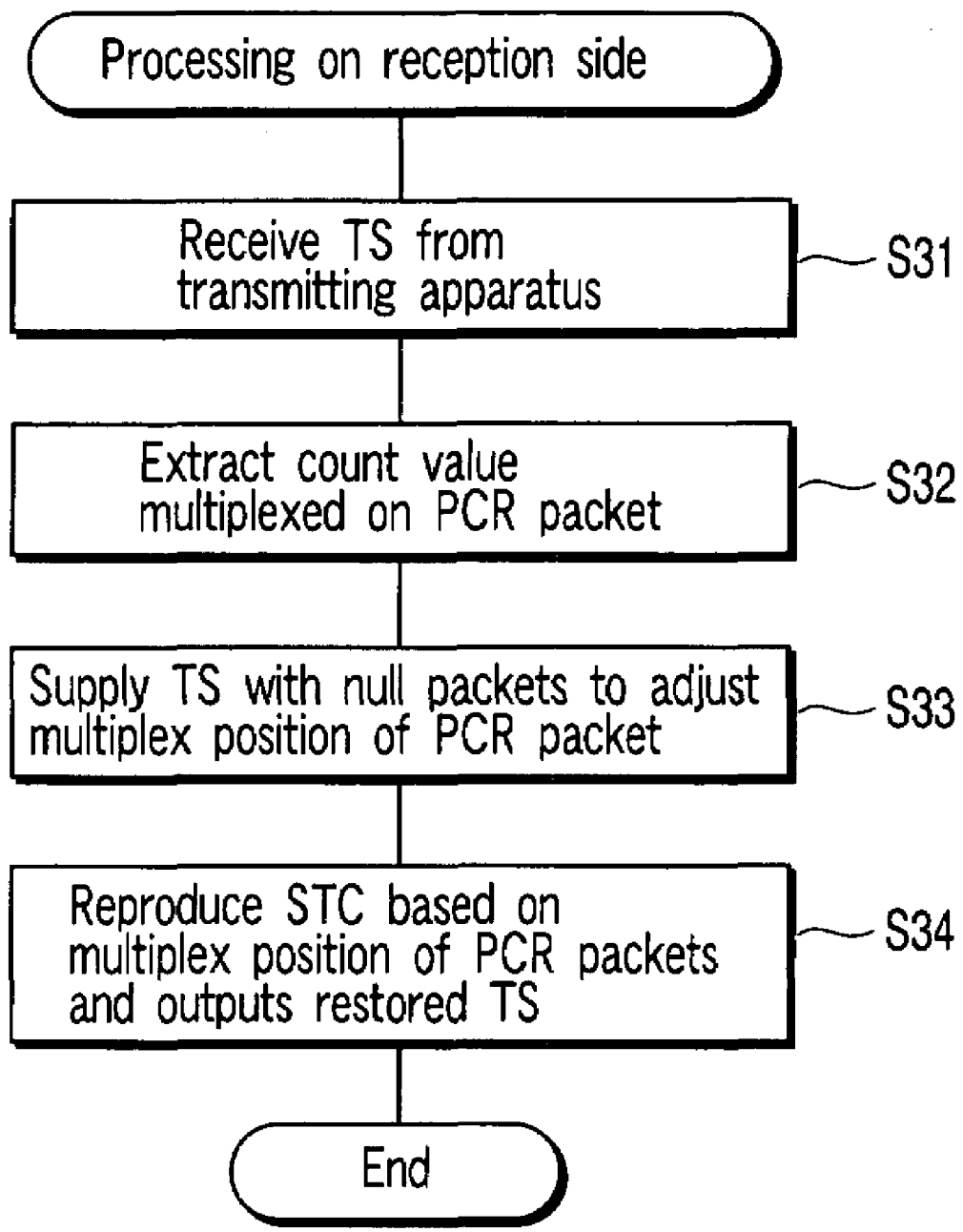
FIG. 3 is a flowchart showing the procedure and content of operation of a receiving apparatus.

Operation of the TS transmission system having the above configuration will next be described. FIG. 2 is a flowchart showing the procedure and content of processing performed in the transmitting apparatus 1. FIG. 3 is a flowchart showing the procedure and content of processing performed in the receiving apparatus 2.

In FIG. 2, an input of the TS is received by the input interface 11 of the transmitting apparatus 1 (step S21). FIG. 4 is a view showing an example of a configuration of the TS input to the transmitting apparatus 1. As shown in FIG. 4, the input TS contains one or more video packets, one or more audio packets, and one or more null packets between PCR packets inserted in the TS at a predetermined interval. The packet counter 12 sequentially counts the packets constituting the input TS and outputs count values (step S22). The packet determination section 16 determines the type (PCR/video/audio/null) of each packet based on the PID of each packet in the input TS (step S23).

The packet determination section 16 determines whether the packet determined in this determination is a null packet or not (step S24). When determining that the packet is not a null packet, the packet determination section 16 outputs to the count value multiplexing section 13 a signal that multiplexes the count value corresponding to the packet on the PCR packet (step S25). FIG. 5 is a view showing an example of a configuration of a TS output from the transmitting apparatus 1. As shown in FIG. 5, upon receiving the above instruction, the count value multiplexing section 13 multiplexes the count values of packets other than the null packets, that is, "1", "4" and "5" of valid packets (TP1, TP4, TP5) on Private_Byte of adaptation_field of a PCR packet (TP7) following the valid packets, together with the count value "7" of the PCR packet (TP7).

On the other hand, when determining that the packet is a null packet, the packet determination section 16 instructs the null packet discard section 14 to discard the null packet. According to the instruction, the null packet discard section 14 extracts the null packet from the TS in which the count values have been multiplexed by the count value multiplexing section 13 and discards it (step S26). As shown in FIG. 5, the null packet discard section 14 extracts the null packets (TP2, TP3, TP6, TP8) from the TS in which the count values have been multiplexed on the PCR packet and discard them. The transmitting section 15 transmits the TS in which the count values have been multiplexed on the PCR packet and from which the null packets have been discarded to the receiving apparatus 2 as a TS for transmission (step S27).

In FIG. 3, on the receiving apparatus 2 side, the receiving section 21 receives the TS for transmission from the transmitting apparatus 1 (step S31). Then, the count value extraction section 22 extracts the count values multiplexed on the PCR packet (step S32). According to the above example, the count values "1", "4", "5" and "7" are extracted from Private_Byte of adaptation_field of the PCR packet (TP7) and input to the packet restoration section 23. Based on the count values extracted by the count value extraction section 22, the packet restoration section 23 supplies the received TS with null packets generated by the null packet generation section 24 to adjust the multiplex position of the PCR packets (step S33). The STC reproduction section 25 reproduces the STC based on the multiplex position of the PCR packets, and the output interface 26 outputs the restored TS based on the reproduced STC (step S34).

FIG. 6 is a view showing an example of a configuration of a TS restored in the receiving apparatus 2. Based on the count values "1", "4", "5" and "7" extracted by the count value extraction section 22 and count value "0" of the immediately previously received PCR packet (TP0), the packet restoration section 23 supplies positions of the dropped count values "2", "3", "6" and "8" with null packets. This allows the multiplexed position of the PCR packets to be correctly adjusted in the receiving apparatus 2, resulting in proper restoration of the TS input to the transmitting apparatus 1.

As described above, in the above embodiment, the transmitting apparatus 1 uses the packet counter 12 to sequentially count packets contained in a TS input thereto. The transmitting apparatus 1 multiplexes count values of packets other than null packets, that is, count values of valid packets on a PCR packet following the valid packets in the count value multiplexing section 13. Further, the transmitting apparatus 1 uses the null packet discard section 14 to extract null packets from the TS in which the count values have been multiplexed, discard them, and transmit to the receiving apparatus 2 the TS whose data amount has been reduced. The receiving apparatus 2 extracts the count values multiplexed on the PCR packets from the received TS in the count value extraction section 22 and uses the packet restoration section 23 to supply the TS with null packets based on the extracted count values. Thus, the receiving apparatus 2 rearranges the multiplex position of the PCR packets to restore the TS to a state before the null packets have been discarded therefrom.

Thus, according to the above embodiment, the TS whose data amount has been reduced in the transmitting apparatus 1 is output to the transmission path to reduce data transmission amount, resulting in transmission of TS in an efficient manner.

The present invention is not limited to the above embodiment. For example, positions of all packets in the TS restored in the receiving apparatus 2 need not perfectly correspond to those in the previous TS from which the null packets have not been discarded, as long as the multiplex position of the PCR packets correspond to each other. An example in this case will be described. FIG. 7 is a view showing another example of a configuration of a TS input to the transmitting apparatus, FIG. 8 is a view showing another example of a configuration of a TS output from the transmitting apparatus, and FIG. 9 is a view showing another example of a configuration of a TS restored in the receiving apparatus. Configurations of the transmitting and receiving apparatuses are assumed to be the same as those shown in FIG. 1.

The packet counter 12 in the transmitting apparatus 1 counts the number of packets contained in the TS as shown in FIG. 7. The count value multiplexing section 13 multiplexes only count values of PCR packets (TP0, TP7) on Private_Byte of adaptation_field of the PCR packets, respectively, as shown in FIG. 8. On the receiving apparatus 2 side, the packet restoration section 23 calculates the number of null packets that have been discarded based on the count value "7" extracted from the received PCR packet (TP7) and count value "0" extracted from the immediately previously received PCR packet (TP0). The packet restoration section 23 then supplies the TS with the null packets corresponding to the number of null packets calculated to restore the multiplex position of the PCR packets. FIG. 9 shows a restored TS. Also with this method, it is possible to rearrange the multiplex position of the PCR packets, allowing a TS equivalent to the previous TS from which the null packets have not been discarded to be restored.

Further, although the count values are multiplexed on Private_Byte of adaptation_field of the PCR packet in the above embodiment, they may be multiplexed on another area. In addition, various modifications may be made to the configurations, operation procedures and contents thereof of the transmitting apparatus 1 and receiving apparatus 2 in the TS transmission system described in above embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transport stream (TS) transmission system which transmits a TS through a transmission path, the TS comprising a video packet, an audio packet, a null packet, and a program clock reference (PCR) packet inserted at a predetermined interval, the system comprising:
    a transmitting apparatus which transmits a TS to the transmission path; and
    a receiving apparatus which receives the TS transmitted from the transmitting apparatus through the transmission path,
    the transmitting apparatus comprising:
        an input interface which receives an input of the TS;
        a counter which sequentially counts the number of packets contained in the input TS and outputs count values;
        a determining section which determines a packet type of each of the packet contained in the input TS;
        a multiplexing section which multiplexes the count values of PCR packets contained in the TS on a predetermined field of each of the PCR packets, based on the packet type;
        a discard section which discards null packets from the TS based on the packet type; and
        a transmitting section which sequentially transmits to the transmission path for transmission of the TS in which the count values have been multiplexed on the PCR packets and from which the null packets have been discarded to the receiving apparatus,
    the receiving apparatus comprising:
        a receiving section which receives the TS transmitted from the transmitting apparatus through the transmission path;
        an extraction section which extracts the count values from the PCR packets contained in the received TS; and
        a restoring section which inserts null packets based on count values multiplexed with respect to a field of the immediately preceding PCR packet and count values multiplexed with respect to a field of the next PCR packet, in order to restore a TS equivalent to a previous TS from which the null packets are discarded.

2. The TS transmission system according to claim 1, wherein
    the multiplexing section multiplexes count values corresponding to packets between an immediately preceding PCR packet and a next PCR packet with respect to a predetermined field of the next PCR packet, based on the packet type.

3. A transmitting apparatus for use in a transport stream (TS) transmission system which transmits a TS through a transmission path, comprising:
    an input interface which receives an input of a TS;
    a counter which sequentially counts the number of packets contained in the input TS and outputs count values;
    a determining section which determines a packet type of each of the packets contained in the input TS;
    a multiplexing section which multiplexes the output count values of program clock reference (PCR) packets contained in the TS on a predetermined position of each of the PCR packets, based on the packet type;
    a discard section which discards null packets from the TS based on the packet type; and
    a transmitting section which sequentially transmits to the transmission path the TS in which the count values have been multiplexed on the PCR packets and from which the null packets have been discarded.

4. The transmitting apparatus according to claim 3, wherein
    the multiplexing section multiplexes the output count values of the packet, other than the null packet contained in the TS, on a predetermined position of each PCR packet.

5. A receiving apparatus for use in a transport stream (TS) transmission system which transmits a TS through a transmission path, comprising:
    a receiving section which receives a TS in which count values have been multiplexed on program clock reference (PCR) packets and from which null packets have been discarded;
    an extraction section which extracts the count values from the PCR packets contained in the received TS; and
    a restoring section which inserts null packets based on count values multiplexed with respect to a field of the immediately preceding PCR packet and count values multiplexed with respect to a field of the next PCR packet, in order to restore a TS equivalent to a previous TS from which the null packets are discarded.

6. A transport stream (TS) transmission method which transmits a TS through a transmission path, wherein
    a transmission side of the transmission path comprises:
        receiving an input of a TS;

sequentially counting the number of packets contained in the input TS and outputting count values;

multiplexing the output count values of program clock reference (PCR) packets contained in the TS on a predetermined position of each PCR packet;

discarding null packets from the TS; and sequentially transmitting to the transmission path the TS in which the count values have been multiplexed on the PCR packets and from which the null packets have been discarded, and a reception side of the transmission path comprises:

receiving the TS transmitted through the transmission path;

extracting the count values from the PCR packets contained in the received TS; and rearranging the multiplex position of the PCR packets of the received TS based on the extracted count values to restore a TS equivalent to the previous TS from which the null packets have not been discarded.

7. The TS transmission method according to claim 6, comprising:

multiplexing the output count values of the packets, other than the null packet contained in the TS, on a predetermined position of each PCR packet.

* * * * *

UNITED STATES PATENT AND TRADEMARK OFFICE
CERTIFICATE OF CORRECTION

PATENT NO. : 7,706,379 B2 Page 1 of 1
APPLICATION NO. : 11/711792
DATED : April 27, 2010
INVENTOR(S) : Kato It is certified that error appears in the above-identified patent and that said Letters Patent is hereby corrected as shown below:

* On the Title page, Item (74), in the "*Attorney, Agent, or Firm,*" line 2, change "Garret" to --Garrett--.

Claim 1, column 5, line 61, change "packet" to --packets--.

Signed and Sealed this

Sixth Day of July, 2010

David J. Kappos
*Director of the United States Patent and Trademark Office*